Jan. 12, 1965 R. W. HILL ETAL 3,165,088
RUDDER POSITION INDICATOR
Filed Oct. 28, 1963
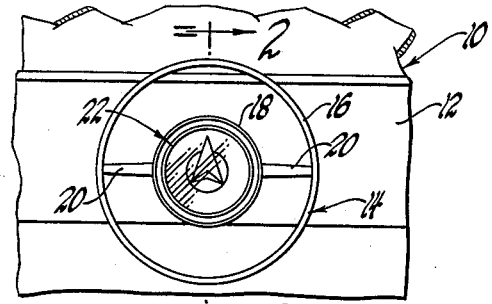
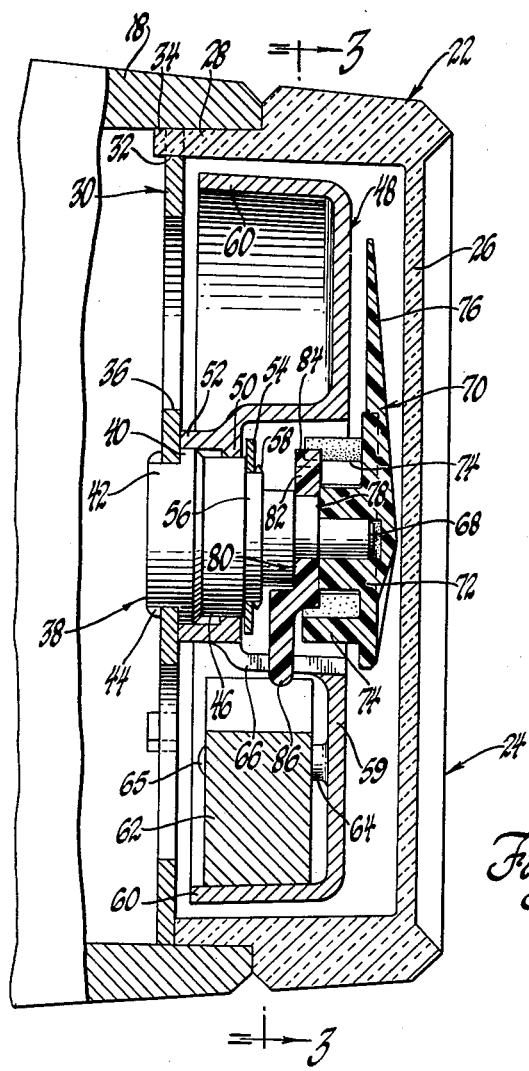
INVENTORS
Raymond W. Hill, &
BY Frank P. Kimball
Barnard, McGlynn & Leising
ATTORNEYS

United States Patent Office 3,165,088
Patented Jan. 12, 1965

3,165,088
RUDDER POSITION INDICATOR
Raymond W. Hill, Sellersville, and Frank P. Kimball, Soudertown, Pa., assignors to Teleflex Incorporated, North Wales, Pa., a corporation of Pennsylvania
Filed Oct. 28, 1963, Ser. No. 319,428
5 Claims. (Cl. 116—31)

This invention relates to a rudder position indicator and more particularly to a device receivable in the steering wheel of a boat or other apparatus which will indicate to the operator the position of the rudder or steering mechanism.

In the design and operation of certain vehicles steerable by some means remote from the structure that causes the vehicle to change its direction, it is often desirable to have some means for indicating to the operator the position of the steering structure relative to the steering device. For example, it is quite common in the construction of boats to provide a rearwardly disposed rudder as part of an outboard motor or an inboard driving system, the location of the rudder being such that the operator of the boat stations himself behind a steering wheel without being able to visually determine the rudder position. Unless he is fully aware of the position of the steering rudder, damage or injury might immediately result upon starting the engine or getting under way. For example, if the boat is adjacent a dock facility and the rudder is improperly positioned, starting the motor is liable to drive the boat directly into the dock. Furthermore, in the open water, if the rudder is positioned at one extreme or the other, starting the engine and the boat may easily result in capsizing and serious injury. Upon attempting to navigate in bad weather or when weather conditions are such that the operator is not able to navigate by visual means, it is important for the operator to know the rudder position so that he may steer the boat along a desired course.

There are numerous devices available for indicating the position of a boat rudder with respect to the boat steering wheel. However, these devices are extremely complicated and require a great number of gears, cables, or other mechanical linkages to link the rudder system to the steering wheel. Such devices, because of the great number of parts involved, are extremely expensive to manufacture, install, and maintain. Furthermore, many of these devices must be installed as an integral part of the steering system and are not easily adaptable or exchangeable between boats.

The device in which this invention is embodied comprises, generally, an indicating unit for steerable vehicles which may easily be placed in the hub of the usual steering wheel and which will immediately and positively show the vehicle operator the position of the steering structure. The device is a self-contained unit and includes a pair of gears, one of which nutates about the axis of rotation of the second while driving the second gear. The first gear has one less the number of teeth than the second gear and drives the first gear in a direct proportion to the amount of rotation of the steering wheel. An indicator arm is attached to the second gear and the position thereof is viewed through the housing containing the gears.

The device has a very few number of moving parts, none of which are heavily loaded nor will wear inordinately with the life of the unit. The small number of parts and the manner in which they are manufactured make the device extremely inexpensive and simple to mount in a steering wheel, either as original equipment or on an already existing steering wheel. The device is extremely uncomplicated and its simple manner of operation does not require extensive adjustment, repair, or replacement of parts. The operation is positive with little possibility of error in its indication of rudder position.

These and other advantages will become more apparent from the following description and drawing in which:

FIGURE 1 is a view of a portion of a boat showing a steering wheel mounted on a typical dash panel.

FIGURE 2 is an enlarged cross sectional view of the rudder indicator position unit mounted in the steering wheel of FIGURE 1, the section being taken substantially along the line 2—2 of FIGURE 1 and looking in the direction of the arrows.

FIGURE 3 is a cross sectional view of the rudder position indicator unit shown in FIGURE 2 taken substantially along the line 3—3 of FIGURE 2 and looking in the direction of the arrows.

Refering more particularly to the drawings, FIGURE 1 shows a portion of a typical boat, illustrated generally by the numeral 10, having a dash panel 12 mounted in the forward wall of the cockpit of the boat and in which is mounted the usual steering wheel 14. Steering wheel 14 has a shaft, not shown, extending through the dash panel 12 and connected in any suitable manner to the steering means or rudder.

Steering wheel 14 is provided with the usual steering rim 16 connected to a hub 18 by a plurality of spokes 20. Mounted in hub 18 in a manner to become hereinafter more apparent is the rudder position indicating unit, illustrated generally by the numeral 22.

Referring more particularly to FIGURES 2 and 3, the rudder position indicator unit 22 is enclosed by a housing, illustrated generally by the numeral 24. Housing 24 may be made of any suitable material, and it is desirable that the forward wall 26 thereof, or at least a portion of the wall 26, be transparent to permit the operator to see through the housing and to the indicator needle. The housing 24 may be of any convenient shape and may be of any convenient size, but it is preferred that there be a cylindrical sleeve 28 extending from the back of the housing. The sleeve 28 is received within the hub 18 of the steering wheel 14 and secured therein in any convenient manner, as by a press or snap fit. Whatever the manner of securement may be, it is desired that the housing 24 be sufficiently secured to rotate with the steering wheel 14 about the axis of the wheel.

At the back of housing 24 is a disc-like retainer, illustrated generally by the numeral 30. Retainer 30 may be of any suitable shape and is illustrated for convenience as being circular. The retainer is provided with a series of circumferentially spaced slots or grooves 32 to receive mating extensions 34 formed on the housing sleeve 28. The extensions 34 and slots 32 permit the retainer 30 to rotate with the housing 24 and thus with the steering wheel 14. Retainer 30 may be provided with a series of holes 36 for lightening purposes.

Secured in the center of retainer 30 and along the axes of the retainer, the housing 18, and the wheel 14, is a shaft, illustrated generally by the numeral 38. The shaft extends into the housing 24 and carries the moving parts of the unit, as will become hereinafter more apparent. Shaft 38 is provided with an annular flange 40 abutting the inner surface of the retainer 30. The shaft end 42 extends through the retainer 30 and is crimped or otherwise secured to the retainer as at 44. Although this is the preferred embodiment of the structure, any suitable means for securing the shaft in the retainer may be used.

Adjacent the annular flange 40 on the shaft 38 and axially disposed with respect thereto, is a step portion 46 of decreased diameter. Mounted on portion 46 is a disc member, illustrated generally by the numeral 48. Disc 48 has a hub 50 which is rotatably received on the step 46, with an annular extension 52 extending axially of the hub 50 and engaging retainer 30. Extension 52 properly spaces the disc 48 along the shaft. Disc 48 is secured on the step 46 in some suitable manner, as by a washer 54 crimped or otherwise secured to a second step 56 as illustrated at 58.

Extending from hub 50 is a radially outwardly directed portion 59 which terminates in a generally axial annular flange 60 extending along the outer periphery of the radial portion 59. Adjacent the lower edge of the disc 48 and within the annular rim 60 is a counterweight 62 secured to the disc 48 in any suitable manner, as by posts 64, peened over the counterweight as at 65. Counterweight 62 is generally arcuate in form to fit within the annular rim 60. Formed in the hub 50 and adjacent the position of counterweight 62 is an axial slot 66, the purpose for which will become hereinafter more apparent.

At the innermost end of shaft 38 is located an indicator gear, illustrated generally by the numeral 70. Gear 70 has a hub 72 rotatably secured on the shaft extension 68 in such a manner that the gear 70 will rotate about the axis of the shaft 38. Extending axially inwardly from the gear 70 are a plurality of posts or teeth 74, the purpose for which will become hereinafter more apparent.

Extending radially outwardly from the opposite surface of gear 70 is an indicator arm 76 which will indicate the position of the rudder relative to the steering wheel, as will become apparent as the description proceeds.

Intermediate the portion 46 and the extension 68 on the shaft 38 is an eccentric portion 78 having an axis in parallel spaced relation to the axis of the shaft 38. An internal gear, illustrated generally by the numeral 80, is mounted on the eccentric portion 78. Gear 80 has a hub 82 rotatably received on the eccentric portion 78 in such a manner that it rotates about the axis of the eccentric portion 78. Hub 82 has a plurality of radial teeth 84 extending outwardly therefrom and into the spaces between the axial teeth 74 formed on the indicator gear 70. The diameter of the internal gear 80 relative to the toothed circle of teeth 74 extending from the hub 74 of the indicator gear 70 is such that only one tooth of the internal gear 80 is in full engagement with the axial teeth 74 of the indicator gear 70. This relationship is more clearly indicated in FIGURE 3 of the drawings. The number of teeth on the internal gear 80 is one less than the number of axial teeth extending from the indicator gear 70. The purpose for this will become more apparent as the description proceeds.

Extending radially outwardly from the hub of internal gear 80 is an arm 86 passing through the slot 66 formed in the hub 50 of the disc 48. Arm 86, and its fixed position with respect to the disc 48, insures that the internal gear 80 will remain in a non-rotating position and will nutate about the axis of the shaft 38 because it is mounted on eccentric 78.

The operation of the rudder position indicator will now be described. With the knowledge that to turn the rudder from the full left to a full right position may require more than one complete rotation of the steering wheel, it is necessary to provide indicating means to show the position of the indicator relative to the position of the steering wheel. A suitable proportion may be predetermined to permit the point of the indicator arm 76 to travel in an arc as the rudder goes from full left to full right position, this determination being dependent upon the length of the arc of travel desired of the indicator arm.

As the steering wheel is rotated, the weight 62 in the disc 48 causes the disc 48 to remain relatively stationary with respect to the ground. That is, the wheel 14 and housing 24 rotate relative to the disc 48. With such rotation the housing 24 and the retainer 30 cause the shaft 38 to rotate with the rotation of the steering wheel and along its axis. Since the disc 48 remains relatively stationary and the internal gear 80 with its arm 86 received in the slot 66, the internal gear 80 will nutate about the axis of the shaft 38. This nutation will cause the fully engaged tooth 90 of the internal gear 80 to disengage from between the associated axial teeth 74 of the indicator gear 70 and the successive teeth 84 of gear 80 to reengage with the successive teeth in gear 70. Thus, the indicator arm 76 is caused to rotate relative to the housing 24 and about the axis of the shaft 38 in its proper proportion and to its proper position indicating the angularity of the rudder of the boat.

In order to tell the rudder position from the indicator arm 76, suitable legends or marks may be added to the housing 24 or to the stationary disc 48 so that the indicator arm 76 will point to a specific mark related to the rudder position. It may also be desirable to coat the indicator arm 76 with a phosphorescent or luminescent coating in order to show the rudder position in the dark.

The rotation ratio between the gear 80 and the indicator gear 70 is predetermined, and it has been discovered that a suitable ratio is nine to one. That is, for each nine revolutions of the steering wheel 14, the indicator gear 70 will make one complete revolution. In order to obtain this ratio, nine axial teeth 74 are formed on the indicator gear 70 and eight radial teeth 84 are formed on the internal gear 80. Of course, if any other ratio is desired, any number of teeth may be provided, it being necessary only to maintain the number of teeth on the inner gear 80 at one less than the number of teeth on the indicator gear 70.

It is thus apparent that a rudder position indicator is provided which is extremely simple and uncomplicated in its manufacture, assembly, and operation. The device is a complete unit in and of itself and is easily adaptable to existing steering wheels without modification. The device has few parts, is inexpensive and efficient in its operation, and positive in its indication of rudder position.

It will be apparent that the indicator device is readily applicable to other mechanisms than the boat and rudder as above described. For example, the unit may be easily adapted to fit in the hub of the steering wheel of a motor vehicle or other wheeled and steerable machine. Other uses will be apparent as well and it is not desired to limit the use to any particular construction.

We claim:

1. A rudder position indicator for a boat having a rudder and a steering wheel for moving said rudder and comprising:

a housing adapted to be secured in said steering wheel and having an axis coinciding with the axis of said steering wheel, said housing being rotatable with said steering wheel about said axis;

a shaft secured in said housing and rotatable therewith and having an axis coinciding with said axis of said housing, said shaft having an eccentric portion with an axis disposed in parallel spaced relation to said axis of said shaft;

a disc rotatably mounted on said shaft and having a weight secured thereto to cause said disc to remain stationary when said shaft is rotated with said housing and said steering wheel;

a first gear rotatably mounted on said shaft and having a plurality of posts extending axially therefrom, and in regularly spaced circumferential relation, said first gear having indicator means extending radially outwardly therefrom;

a second gear rotatably mounted on said eccentric portion and disposed within the circumference of said posts, said second gear having a plurality of teeth extending radially outwardly therefrom and engaging some of said posts on said first gear and having one less teeth than the number of posts on said first gear, and said second gear being engaged with said stationary means and adapted to nutate about the axis of said shaft when said shaft is rotated to drive said first gear in direct proportion to the rotation of said steering wheel and indicate the position of the rudder on said boat.

2. The rudder position indicator of claim 1 wherein a portion of said housing is transparent to permit visual observance of said indicator means.

3. The rudder position indicator of claim 1 wherein the number of posts on said first gear is nine.

4. A rudder position indicator for a boat having a rudder and a steering wheel for moving said rudder and comprising:
- a housing adapted to be secured in the hub of said steering wheel and rotatable therewith;
- a shaft secured in said housing and rotatable therewith, said shaft having an eccentric portion with an axis in parallel spaced relation to the axis of said shaft;
- a disc mounted on said shaft and adapted to remain stationary when said shaft and said housing are rotated;
- a first gear mounted on said shaft and having a plurality of posts formed thereon and extending axially therefrom, said gear having indicator means extending radially outwardly therefrom;
- and a second gear mounted on said eccentric portion and having a plurality of teeth extending radially therefrom and engaging said posts on said first gear, the number of teeth on said second gear being one less than the number of posts on said first gear, and said second gear being engaged with said disc to prevent rotation of said second gear about said axis of said shaft and permit rotation of said second gear about said axis of said eccentric portion for rotating said first gear in proportion to the rotation of said shaft and said housing and indicate the position of said rudder.

5. A rudder position indicator for a boat having a rudder and a steering wheel for moving said rudder and comprising:
- a transparent lens adapted to be secured in the hub of said steering wheel and rotatable therewith;
- a retainer secured to said lens within said hub;
- a shaft secured to said retainer and rotatable about the axis of said retainer with said retainer and said lens, said shaft having first and second axial step portions and an eccentric portion, said eccentric portion having an axis disposed in parallel spaced relation to the axes of said step portions;
- a disc rotatably mounted on said first step portion, said disc having a weight secured thereto to maintain said disc in substantially fixed relation to the ground when said shaft is rotated;
- an internal gear rotatably mounted on said second step portion and having a plurality of posts extending axially therefrom; said gear having an indicator arm extending radially outwardly therefrom;
- and an external gear rotatably mounted on said eccentric portion and having a plurality of teeth extending radially therefrom and engaging said posts on said internal gear, the number of teeth on said external gear being one less than the number of posts extending from said internal gear, said external gear being connected to said disc and stationary therewith when said shaft rotates about said axis of said shaft and rotating about said axis of said eccentric portion when said shaft rotates to drive said internal gear in direct proportion to the rotation of said shaft and said steering wheel, and said indicator arm indicating the position of the rudder of said boat.

References Cited by the Examiner

UNITED STATES PATENTS 2,845,893  8/58  Eshbaugh et al. _____ 116—31
3,080,953  3/63  Edgemond _____ 114—144

LOUIS J. CAPOZI, *Primary Examiner.*